US005829766A

United States Patent [19]

Göhlert

[11] Patent Number: 5,829,766

[45] Date of Patent: Nov. 3, 1998

[54] DEVICE FOR DRESSING AND UNDRESSING AND FOR THE CLEANING AND CARE OF THE BODY OF A HANDICAPPED PERSON

[75] Inventor: Irmgard Göhlert, Schmiedekoppel 110, 23611 Bad Schwartau, Germany

[73] Assignee: Irmgard Gohlert, Bad Schwartau, Germany

[21] Appl. No.: 897,308

[22] Filed: Jul. 21, 1997

Related U.S. Application Data

[63] Continuation of Ser. No. 436,215, filed as PCT/DE93/01081, Nov. 12, 1993, abandoned.

[30] Foreign Application Priority Data

| | | | |
|---|---|---|---|
| Nov. 14, 1992 | [DE] | Germany | 9215515.4 U |
| Apr. 10, 1993 | [DE] | Germany | 9305617.6 U |

[51] Int. Cl.[6] ..... B62M 1/14

[52] U.S. Cl. ..... 280/47.34; 280/250.1; 5/613

[58] Field of Search ..... 280/47.34, 47.35, 280/47.371, 47.38, 47.131, 47.17, 47.19, 47.25, 250.1; 5/60, 613, 617

[56] References Cited

U.S. PATENT DOCUMENTS

| | | | |
|---|---|---|---|
| 2,596,055 | 5/1952 | Thomas | 280/304.1 |
| 3,165,314 | 1/1965 | Clearman et al. | 482/68 |
| 3,431,020 | 3/1969 | Tyndall | 297/467 |
| 3,708,182 | 1/1973 | Markiel | 280/288.4 |
| 4,029,089 | 6/1977 | Mulholland | 602/5 |
| 4,165,127 | 8/1979 | Vago | 297/344.18 |
| 4,620,714 | 11/1986 | Davis | 280/250.1 |
| 4,809,997 | 3/1989 | Owens | 280/250 X |
| 4,917,395 | 4/1990 | Gabriele | 280/250.1 |
| 4,927,167 | 5/1990 | Davis | 280/250.1 |
| 4,968,050 | 11/1990 | Kendrick et al. | 280/250.1 |
| 5,090,070 | 2/1992 | Heinz | 5/611 |
| 5,101,536 | 4/1992 | Gabriele | 16/386 |
| 5,133,377 | 7/1992 | Truxillo | 135/67 |
| 5,172,925 | 12/1992 | Kendrick et al. | 280/250.1 |
| 5,340,139 | 8/1994 | Davis | 280/250.1 X |
| 5,484,151 | 1/1996 | Tholkes | 280/250.1 |
| 5,556,120 | 9/1996 | Davis | 280/250.1 X |

FOREIGN PATENT DOCUMENTS

| | | |
|---|---|---|
| 363 727 | 10/1988 | European Pat. Off. . |
| 92/00712 | 1/1992 | WIPO . |

*Primary Examiner*—Kevin Hurley
*Attorney, Agent, or Firm*—Burns, Doane, Swecker & Mathis, L.L.P.

[57] ABSTRACT

A device assists in removing a patient from a chair and positioning the patient on his/her stomach. The device includes a wheeled frame which is movable forwardly and rearwardly relative to the chair. The frame carries a chest support, a knee support, and optionally a head support. The chest and knee supports can be swingable for adjustment and storage. The device can be separate from the chair or attached thereto for relative movement.

6 Claims, 4 Drawing Sheets

DEVICE FOR DRESSING AND UNDRESSING AND FOR THE CLEANING AND CARE OF THE BODY OF A HANDICAPPED PERSON

This application is a continuation of application Ser. No. 08/436,215, filed Jul. 12, 1995 abandoned.

BACKGROUND OF THE INVENTION

The invention relates to a device for assisting in the dressing and undressing and the cleaning and care of the body of a handicapped person who is in a chair.

According to the prior art, there are aiding devices, which are used for the care of handicapped persons. Lifting devices and mobile chairs are also known, which are supposed to make the care of a handicapped person easier.

These devices do not make it possible, however, to care for the handicapped person, in particular in the area of the excretory organs. The care expenditure turns out to be especially difficult for the care givers in this area of the body, since the handicapped body can often only be held or turned by several people, in order to make sufficient access to this area of the body possible. This area of the body must be washed not infrequently during the day and fresh diapers must be applied. The appropriate personnel must always be available for this work in order to make this area of the human body accessible for care.

SUMMARY OF THE INVENTION

It is therefore the task of the invention to create a device which makes it possible to care for the body of a handicapped person more easily with regard to the poorly accessible excretory area. The problem is solved in the invention by that the device comprises a mobile frame with a patient-carrying surface, which can be tilted upwards at various angles about an axis parallel to the base of the device near the bottom of the frame, means of being fitted on the patient-carrying surface to support the body or hold it in place. Through this design of the device it is managed to reposition the patients, or rather the body of the handicapped person, from a sitting position into a bridge-type kneeling position. To this end the mobile frame is driven in front of the handicapped body from the front side, whereby the angle of adjustment of the patient-carrying surface is set as steeply as possible. With the help of a care giver, the human body is transferred to the steep patient-carrying surface. For this, the human body is supported on the patient-carrying surface by means which hold him in the bridge-type kneeling position. Afterward the patient-carrying surface is tilted from a steep position into a flatter position, so that the patient on it is brought to a more stable position. It is achieved in an advantageous manner that the diapers or the pieces of clothing, in particular in the excretory area, can now be removed, so that the care giver can clean and care for this area. Furthermore, human body can be driven lying on a device, in accordance with the invention, into a showering arrangement. The care giver can then clean the human body on this device and redress him after completing his care and drive him back to his bed or chair.

In an embodiment of the invention, the frame comprises two pipes arranged in parallel, between which the patient-carrying surface is arranged, whereby an extension arm for tilting the patient-carrying surface on the pipes is coupled on the underside of the patient-carrying surface. By means of this extension arm, the adjustment angle setting the human body is adjusted in a simple way. Making the frame from pipes guarantees that the device is light and stable as such.

For this the adjustment angle of the patient-carrying surface can be set very steeply based on the telescoping ability of the extension arm. The telescoping process can be facilitated for this by a hydraulic device. The setting of the various angled positions takes place in a practical way through a catching device. Rollers or wheels are provided on the extension arm for moving the device or for tilting the extension arm on the standing surface.

In a practical way the means formed on the patient-carrying surface for supporting the human body are fastened between the pipes. For this the means formed on the patient-carrying surface comprise a head support, a chest support and a knee support. The mounted body is supportably positioned in this way in the chest area either on the chest itself or on the elbows on the chest support. For support in the knee area, there is a knee support in the lower area, on which the lower region of the body is mounted on the knees.

The bridge-type positioning of the human body on the patient-carrying surface in accordance with the invention is achieved through this support of the human body. A head support is attached above the chest support in a practical manner, on which the head can be laid as needed. The head support is arranged in a suitable manner between the pipes such that is can be tilted for adjusting the height and is designed so it can be released from the frame. The chest support can be designed for this as a one or two-piece hollow. The two-piece hollow is available for the elbows in a practical manner. The knee supports can also be adapted according to the body size or the storage position on the patient-carrying surface by tilting or adjusting the height of pipes arranged in parallel.

According to the advantageous embodiment of the invention tiltable frame for holding on the sides or support when laying the person's body on the patient-carrying surface arranged on the pipes which run in parallel. The frames which can be tilted to the side offer the patient security during the repositioning process in that he can hold on to these frames and support himself. The patient does not need to set their hands or their supporting elbows in the frame or grasp the frame with their hands in the repositioning process, since the frame is built so that it swivels and the movement of the laying the patient from the sitting to the lying bridge position occurs with it. In addition these frames attached on the side prevent the human body from sliding to the side off the device and gives the patient a feeling of security during handling.

To this end the frames are formed in a practical way from longitudinal and transverse pipes flexibly connected with each other arranged in a parallelogram, which make the tilting motion possible in the movement of positioning the body of the handicapped person. If the patient is still in the sitting position, then he can grasp the side frames with one or both hands, or support himself with his elbows in the gripping hollow and hold tight. With the support of the care giver the handicapped person can now move to the slanted patient-carrying surface, whereby the parallelogram-shaped pipe construction moves in the direction toward the patient-carrying surface, so that the side support is guaranteed at every point during the movement process. A foot support exists on the end on the pipes which run in parallel in the area of the tilting axis for supporting the bottoms of the feet when repositioning. This foot support can be fixed in angled positions by means of a lock-in positioning for this so that the device, as for example, a cart can be driven under the bottoms of the feet of the person's body to be handled. For good and better handling of the device for the care giver, handles are provide on the end on the pipes. To drive the device, wheels are arranged on the tilting axis in the area of the attached foot supports, which guarantee the mobility of the device in connection with the wheels on the extension arm.

According to an additional advantageous configuration of the invention, the frame can be folded on its middle axis, whereby a joint in the area for the middle axis is arranged on the head part, chest part, knee part and foot support in each case. The folding ability makes it possible to make the entire device smaller as a unit so that the device can be stowed easily and set up in case of need by the care giver.

According to another advantageous configuration of the invention the frame can be separated at its middle axis, whereby a joint in the area for the middle axis is arranged on the head part, chest part, knee part and foot support in each case. Through this ability to separate, both parts can be set somewhat to the side on a chair (shower chair) so that the cleaning work is made considerably easier.

A preferred first alternative embodiment is given by that the frame is designed as an angular frame and has at least one front, preferably telescoping support with roller and a horizontal leg, as well as preferably a rear support with roller, and that the patient-carrier surface provided on the support is designed as one piece and has at least chest and knee supports, preferably formed as a hollow, connected tiltably about a vertical axis, which can be tilted about horizontal axes and the width of which corresponds largely to the width of the seat. A second embodiment is given by that the frame is designed as an angular frame in two parts mirroring one another over the middle axis and each half has at least a front, preferably telescoping support with roller and preferably a rear support with roller, and that the patient-carrier surface provided on the support is designed as two pieces and each partial surface has at least chest and knee supports, preferably formed as a hollow, connected tiltably about a vertical axis, which can be tilted about horizontal axes and the width of which corresponds largely to the width of the seat. With these embodiments, a device that is connectable with a chair—whether it is a handicapped chair, shower chair or other type of mobile chair—is created which allows the repositioning of the body of a handicapped person for care without overtaxing the care giver.

Joints are provided advantageously for coupling the tiltable extension arm which is locked in a rotated-out position by a unit against further movement. With these joints the supports can be swiveled into the position which is required for repositioning the body. The setting of the joint on a lock prevents a danger of swivelling out too far. Releasable catches can also be provided for setting, which fix the desired positions of the supports. The work to be performed by the care giver can be made easier if the height of the front support can be lessened; in this way the upper body of the patient is positioned lower, and the access to areas requiring care is made easier. To connect the angular frame with the chair it is proposed that the horizontal legs of the angular frame are integrated in the side parts with the arm rests of the chair, whereby each of the parts of the angular frame is extendable on or from the side parts of the chair with the arm rests and has at least one front support with a roller, and whereby the angular frame can be put in front of the chair by distension, and whereby the horizontal leg preferably forms arm supports which move with it. This embodiment allows a direct connection of the angular frame to the chair, whereby, for example, the horizontal leg and the arm rests are connected with rails and rollers with a distending-type conduction. In an alternative form the horizontal leg of the angular frame is integrated in the side parts with the arm rests of the chair, whereby each of the parts of the angular frame is coupled on the side parts of the chair with the arm rests so it can swivel and has at least one front support with a transverse roller, and whereby the angular frame can be put in front by swivelling the chair, and whereby the horizontal legs preferably form arm supports which move with it. In both embodiments it is achieved that the angular frame is set in front of the arranged side part of the chair, whereby the first embodiment allows a pulling out or a pushing in and the second embodiment allows a swivelling out or in. For this the horizontal legs of the angular frame, quasi forming the lengths of the arm rests when the angular frame is pulled out or swivelled out, are significant, since the patient can hold onto this (at least on one side). For this the angular frame is advantageously attached on the side part so that it can be removed, which allows the use of several chairs. For the specific positioning of the patient a head support is arranged swivellably in a practical way between the pipes of the pipe frame or the horizontal legs of the angular frame for height adjustment and is releasable as needed from the pipe frame or the angular frame. The same is true for the knee support which is arranged advantageously adjustably between the parallel pipes of the pipe frame or the supports of the angular frame. A foot support coupled on the end on the parallel pipes of the pipe frame or the supports of the angular frame, which can be fixed by means of a catch device adds to the comfort, whereby the adjustment of the knee support in particular and also the foot support has particular meaning for caring for patients with arthritis in the knees.

BRIEF DESCRIPTION OF THE DRAWINGS

The substance of the invention is explained in greater detail with the help of the embodiment depicted in FIGS. 1 through 7; these show:

FIG. 2: A side view of a second embodiment of a device with angular frame that can be set on a chair, supported on both ends, knee and chest supports swivelled in;

DETAILED DESCRIPTION OF PREFERRED EMBODIMENTS OF THE INVENTION

Figure 1:
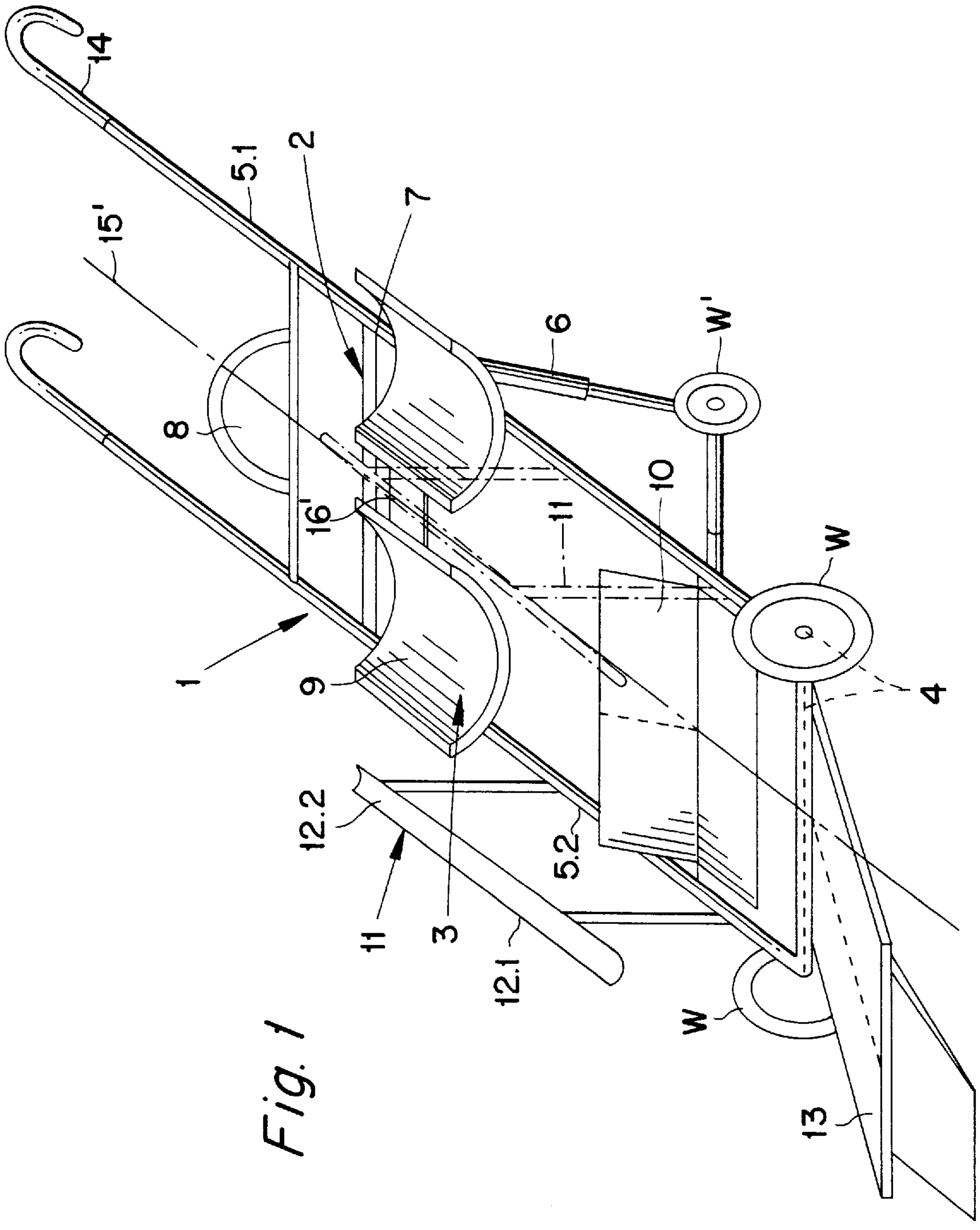
FIG. 1: A first embodiment of a device that can be positioned relative to a chair for dressing or cleaning and caring of the body of a handicapped person.

In FIG. 1 the device in accordance with the invention for dressing or cleaning and caring for the body of a handicapped person is indicated by the reference number 1. The device 1 comprises a mobile frame 2, in which a patient-carrying surface 3 can be swivelled and positioned in different angled positions. The frame 2 carries wheels W. To adjust the various angled positions, the patient-carrying surface 3 can be swivelled about an axis defined by a wheel axle 4 running parallel to the standing surface in the frame 2. The patient-carrying surface 3 has means 8, 9, 10 which support and hold the body of the handicapped person.

The frame 2 is formed from two parallel pipes or support elements 5.1 and 5.2, between which the patient-carrying surface 3 is attached. On the underside of the patient-carrying surface 3 an extension arm 6 for adjustment of the angle of the patient-carrying surface 3 is attached. The extension 6 arms are mounted by rotary joints to respective pipes 5.1 and 5.2 so that the arms 6 swivel with respect thereto. The positioning points 7 for the joints are located approximately in the upper area of the frame 2. To set the angled position in each case of the patient-carrying surface 3 the extension arm has a catch arrangement (not depicted), which holds the angled position of the patient-carrying surface 3 stable. To achieve as steep a patient-carrying surface 3 as possible, the extension arm 6 is arranged so that it telescopes, whereby the telescoping ability can result by providing the arm 6 as a hydraulic unit. Wheels W' are attached at lower ends of the arms 6.

The means which form the patient-carrying surface 3 for supporting the human body are attached between the parallel pipes 5.1 and 5.2. These means comprise a head support 8, a chest support 9 and a knee support 10. The head support 8 is positioned between the pipes 5.1 and 5.2 and can be swivelled to a position proper for the head and can be taken out of the frame 2 as needed. The chest support 9 can be designed as a one or two-piece hollow. The drawing shows the two-piece design of a hollow, in which the elbows can be supported to achieve the bridge position of the body of the handicapped person on the patient-carrying surface 3. The chest would be laid in the chest support 9 in the case of a one-piece hollow, so that the chest obtains sufficient support on the patient-carrying surface 3. The last support means, the knee support 10, is located in the lower area of the frame 2 between the pipes 5.1 and 5.2. The knee support 10 can be designed hollow-style or dish-style, in order to give the knee joints the sufficient hold so that the patient lying thereon has sufficient surety of support.

On the parallel pipes 5.1 and 5.2 rails on frames 11 (one frame 11 shown in phantom in FIG. 1) are arranged for holding or supporting on the side when positioning the human body on the patient-carrying surface 3. The frames 11 are formed from longitudinal and transverse pipes 12.1 and 12.2 which are arranged in a parallelogram connected to one another flexibly. The longitudinal and transverse pipes 12.1 and 12.2 which are arranged in a parallelogram are positioned on the pipes 5.1 and 5.2 of the frame 2 so that they can swivel along with the pipes 5.1, 5.2. Through the parallelogram-configured frame shape 11 the body of the handicapped person can support itself or hold itself tight during the repositioning movement in particular on the transverse pipe 12.2 that moves along with it.

On the bottom end of the frame 2 a foot support 13 is fixed on the end on the parallel pipes 5.1 and 5.2 and can be set by a catch arrangement which is not depicted. The existing foot support 13 can be maneuvered to a position, between the legs of a chair (not shown), so that the patient sitting in the chair can place the bottoms of his feet on the foot supports 13 and in this way have an initial direct contact with the device 1. Afterward the appropriately steep angle of the patient-carrying surface 3 is set by means of the extension arm 6 through swivelling and telescoping. The patient is then conducted onto the patient-carrying surface 3 with the support of a care giver, so that first the knee area is positioned on the knee supports 10. Then the elbows are laid in the chest support 9 to angle the body of the handicapped person. The head support 8 can be placed additionally between the pipes 5.1 and 5.2 as needed. The body of the handicapped person laid thus on the patient-carrying surface 3 in a bridge position now allows the care giver easier access to the excretory areas of the human body. In this position the diaper can be removed from the human body easily in order to clean the excretory organs and to apply a new diaper again after cleaning. It is also conceivable here to drive the person laid on the mobile frame 2 into a showering arrangement, where the entire body can then be cleaned. After caring for the patient lying here, he is driven back to his bed or chair and repositioned again from the patient-carrying surface 3 in reverse order by the appropriately steep angle of adjustment by the extension arm 6. Handles 14 are arranged on the service side on the parallel pipes 5.1 and 5.2 for mobile handling of the frame 2.

According to an embodiment of the invention, the frame 2 can be folded about a middle axis 15. For this, joints 16' are arranged in the area of the middle axis 15' of the device 1 on the head support 8, the chest support 9, and the knee support 10 as well as the foot support 13. In this way the frame 2 can be halved in size for better storage of the device 1. The device 1 can be better stored not only in closets for this reason, but one can also better transport this device 1 in a car, so that the device 1 can be easily taken along when, for example, transferring the patient.

Figure 2:
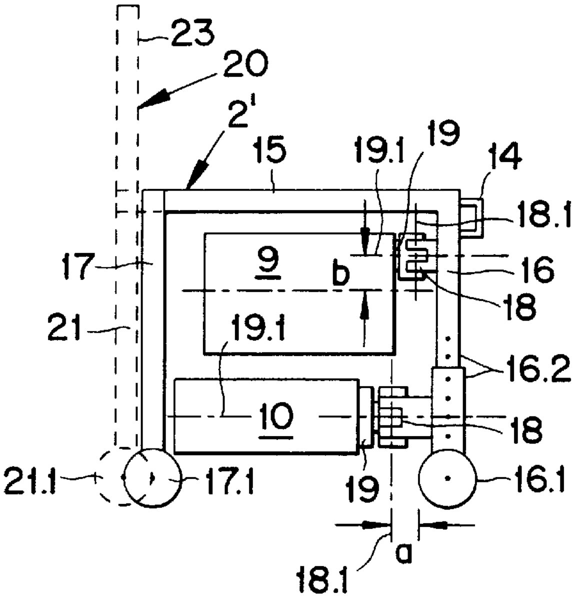
Figure 3:
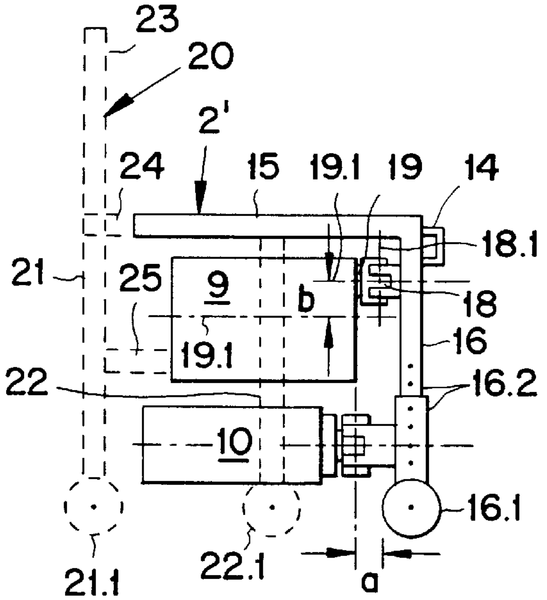
FIG. 3: A side view of a device similar to FIG. 2 without a rear upright support and partially moved forwardly relative to the chair.
Figure 4:
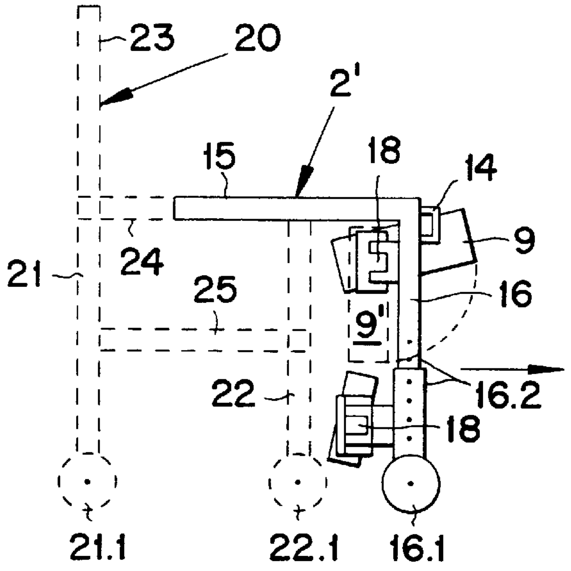
FIG. 4: A side view of a device in accordance with FIG. 3, with the knee and chest supports swivelled out.
Figure 5:
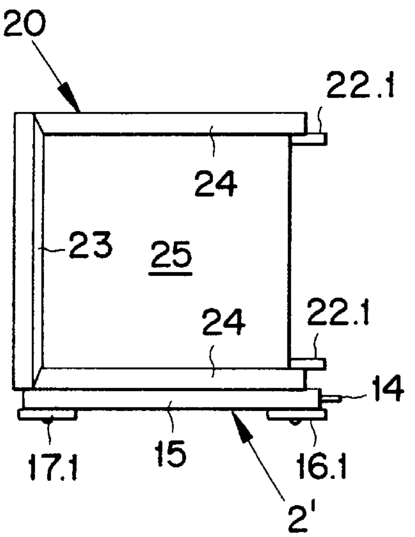
FIG. 5: A top view of the device of FIG. 2.
Figure 6:
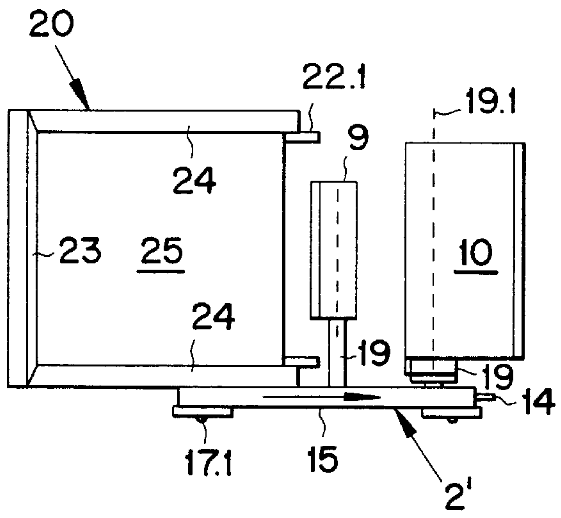
FIG. 6: A top view of the device of FIG. 5 in a pulled out condition, with the chest and knee supports in a patient-engaging position.

Another embodiment is shown in FIGS. 2 through 6 and 8. The structure depicted in those figures is the same except that FIGS. 2, 5 and 6 show a frame 2' as having a rear wheel 17.1, whereas FIGS. 3 and 4 show a frame 2' which does not have such a rear wheel 17.1. The frame 2' comprises an angled frame 2' which is set or integrated on a mobile chair 20 (shown in broken lines in FIGS. 2–4), whereby the chair is provided with rollers 21.1 on the rear legs 21 of the chair as well as rollers 22.1 on the front legs 22 of the chair (these are partially left out in FIG. 2 for better clarity), and whereby the rear legs 21 of the chair are continued upward to form the mounting for the seat back 23. The angular frame 2' is formed from a front support 18 and a single horizontal leg 15 attached on the upper end thereof, which leg 15 props against an arm rest 24 of the chair 20 and can be moved along with the chair. An alternative is offered in that the angular frame 2' has a rear support 17 which can be seen in FIG. 2, which is provided with a roller 17.1. In both embodiments a handle 14 is provided on the front support 16 for better handling. The embodiment of FIG. 2 the angular frame 2' can be driven independently of the chair 20. The front support has two joints 18 provided at different heights, on which the chest and knee supports 9 and 10 are attached so they can swivel about vertical axes 18.1. A distance "a" by which both of the swivel axes 18.1 are spaced from one another (and from the front support) is such as to ensure that the chest and knee supports are a suitable distance from one another to properly support the patient. The chest and knee supports 9 and 10 are connected by respective extension arms 19 with the joints 18 and can be swivelled about horizontal axes 19.1, whereby with the distance "b" from the swivel axis 19.1 of the support 9 to the middle of the support 9. The support 9 can be swiveled to a vertical position in which it can be swung about axis 19 to a storage position below the leg 15 as shown in FIG. 2. It is advantageous to carry out the swivelling about the horizontal axis 19.1 against a spring resistance, whereby the spring resistance causes a return to the original position. FIG. 4 shows the embodiment as in FIG. 3 with angular frame 2' pulled out and chest and knee supports 9 and 10 swivelled into the position of use. The chest support swivelled according to the indicated arrow against the load is fixed in the lying position, perhaps by securing pins, catches, clamps or similar items.

Figure 7:
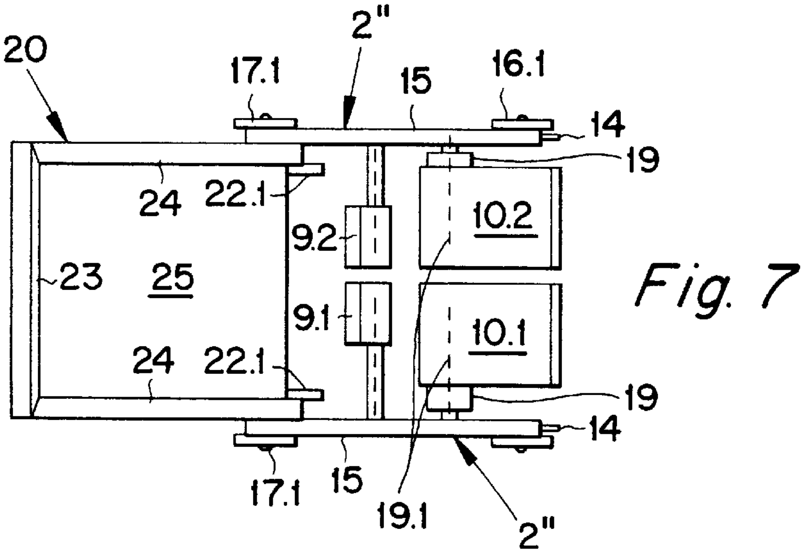
FIG. 7: A top view of another embodiment of a mobile chair for handicapped persons with device set on both sides, knee and chest supports swivelled in the lying position.

FIGS. 5 and 6 show these points from a top view, whereby the chair 20 here is fully depicted. In FIG. 5 the angular frame 2 is set against an arm rest 24 of the chair 20, whereby it is obvious that the arm rest can have a guide (not shown in closer detail), engaged by a slot 15.1 on the horizontal leg 15 (see FIG. 8). This would be especially useful in connection with the embodiment of FIGS. 3, 4 wherein no rear wheel 17.1 is provided on the frame 2'. Both supports, chest support 9 and knee support 10 are swivelled into the plane of the angular frame 2' and can not be seen in FIG. 5. FIG. 6 shows the angular frame 2 pulled out, whereby the angular frame is fixed on one side to the chair 20. The chest support 9 and the knee support 10 are swivelled about the vertical axes 18.1 (FIG. 2–4) as well as about the horizontal axes 19.1 into the position of use. FIG. 7 shows an embodiment in which an angular frame 2" is fixed to both sides of the chair 20. In this embodiment the chest supports and the knee supports are divided into two halves 9.1, 9.2 and 10.1, 10.2 and are swivelled toward one another by a part of the angular frame 2". To be able to reposition the patient sitting on the seat 25, this device must be put in the position of use. For this, the angular frame 2' or 2" is set before the chair 20, whereby it does not matter if it is separate from the arm rests 24 (as shown), provided as integral components of the arm rests 24 of the chair 20 and can be swivelled out or pulled out. It is essential in these movements that the angular frame 2' is first displaced so far forward that the chest support 9 or chest supports 9.1 and 9.2 can be swivelled in the joints 18 about the vertical axes 18.1 and turned about horizontal axes 19.1 of the extension arm 19 into the position of use. The angular frame 2' or 2" is then brought into a position in which the patient can lay his knees or the upper end of his lower leg against the knee support(s) 10 or 10.1 and 10.2. He is pulled forward with the support of a care giver so that his chest and shoulder area lays against the chest support(s) 9 or 9.1 and 9.2, whereby the patient can support himself on the horizontal leg (s) 15 or 15.1 and 15.2 designed in the style of a hand rail. The patient is finally pulled so far forward that the excretory areas are easily accessible for the care giver and cleaning, diapering and dressing is possible without trouble. To additionally lower the upper body of the patient the front support 16 is built so that it telescopes by hand or under hydraulic operation, whereby—as is shown here—insertion bolts ensure the position. The angular frame 2' (FIG. 6) set on only one side of the chair offers the advantage of better accessibility, while the embodiment with angular frames 2" mounted on both sides (FIG. 7) guarantees a higher degree of stability, whereby it is obvious that the free end of the supports 9 and 10 can have, for example, foldable supports for the angular frame set on one side, in order to resist the tipping force that occurs.

Figure 8:
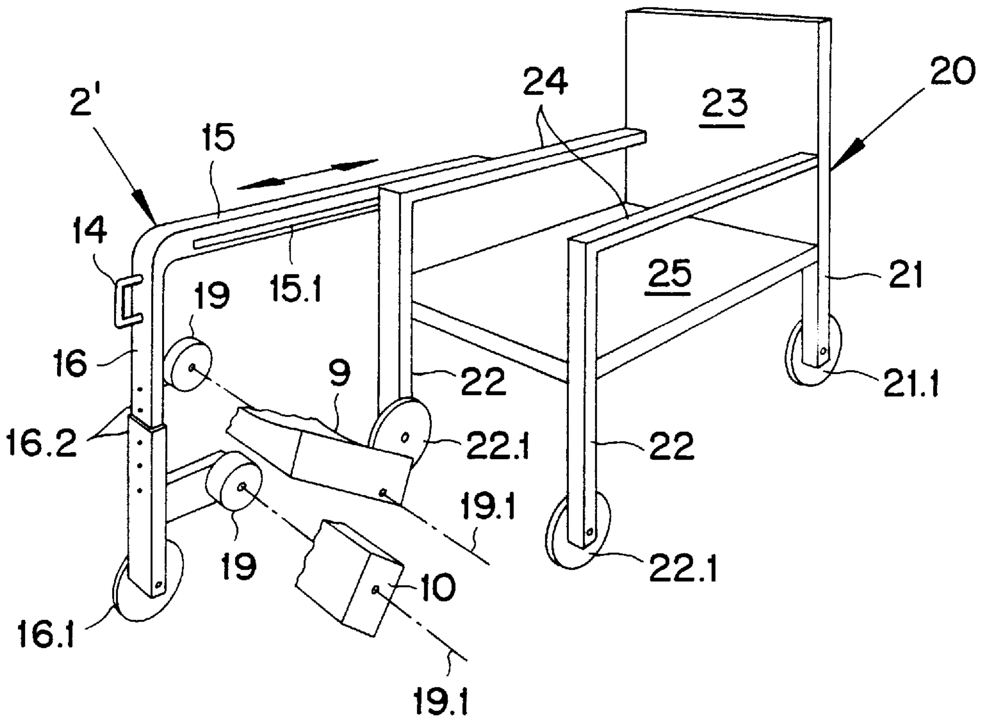
FIG. 8: A perspective representation of the chair similar to FIG. 3, with the frame attached to the chair.

FIG. 8 shows a perspective drawing of a chair 20 in accordance with FIG. 3 with an angular frame 2' set shiftably. The chair 20 with its rear and front legs 21 and 22, each provided with a wheel 21.1 or 22.1, has a rest 23 in the extension of the rear legs 21 of the chair, as well as a seat 25. On both sides arm rests 24 are located above the seat surface 25, which give the handicapped person supports and holds in the position. On the one arm rest (on the right arm rest in the drawing) the angular frame 2' is set, which has a horizontal leg 15 parallel to the arm rest 24, the front end of which is supported with a support 16 with roller 16.1, and in which a guide 15.1 is provided, in which guide elements—perhaps guide rollers—provided on the arm rest engage. On the front support 16 the extension arms 19 with the rotating joints with horizontal swivel axis 19.1 are set in joint pieces 18 (FIGS. 2, 3, 4) with vertical swivel axis 19.1, which for their part carry the chest and knee supports 8 and 10 (only indicated in the drawing), whereby these supports can be swivelled about the horizontal swivel axis 19.1. It is advantageous if the swivelling of at least the knee support 10 occurs against a spring resistance, which provides for returning the supports to their original (stored) position when unloaded. The chest support is fixed for safety advantageously by a catch or clamp. The angular frame 2' or 2" is removably connected to the chair so that it can be set on other chairs. For this, interlocking holding and guiding elements are used which engage in one another and which also allow a pulling forward as well as a removal. Clasps or similar items can also be used, which establish a releasable but also solid connection between the chair 20 and the angular frame 2' 2".

I claim:

1. A mobile apparatus for supporting a patient in a generally kneeling position, comprising:

a frame including a pair of substantially parallel support elements, each support element having a top end and a bottom end and extending in a generally straight line from the top end to the bottom end;

first support wheels mounted directly to the bottom ends of the support elements for supporting the frame;

a chest-supporting structure connected directly to the support elements at a location above an axis of the wheels for supporting a chest region of the patient;

a generally horizontal knee-supporting portion connected directly to the support elements below the chest-supporting structure for supporting knees of the patient, the knee supporting portion extending in a rearward direction from the frame;

a plurality of additional support wheels mounted to the frame in spaced relationship to the first support wheels for supporting the frame together with the first support wheels, all additional support wheels disposed forwardly of the first wheels;

handles connected to upper ends of the support sections to enable the frame to be manually displaced; and laterally spaced side supports connected to respective support elements for laterally supporting the patient;

the chest-supporting portion and the knee-supporting portion being rotatably adjustable to enable an inclination thereof to be varied relative to horizontal with the first and second support wheels remaining in contact with the ground in all positions of adjustment of the chest-supporting and knee-supporting portions, and an adjustment mechanism provided for holding the chest and knee-supporting portions in adjusted positions.

2. The apparatus according to claim 1, wherein the adjustment mechanism comprises a telescoping arm interconnecting the frame and the additional wheels.

3. The apparatus according to claim 1, wherein the frame is foldable about a center axis extending parallel to the support element.

4. The apparatus according to claim 1, wherein the frame is rotatably adjustable relative to the axis of the wheels to vary the inclination of the chest and knee-supporting portions.

5. The apparatus according to claim 1, further comprising a head-supporting portion connected to the frame for supporting a patient's head.

6. A mobile apparatus for supporting a patient in a generally kneeling position, comprising:

a frame including parallel support elements;

wheels mounted to a bottom of the frame for supporting the frame;

a chest-supporting portion connected to the frame for supporting a chest region of the patient;

a knee-supporting portion connected to the frame below the chest-supporting portion for supporting knees of the patient;

handles connected to the frame to enable the frame to be manually displaced; and laterally spaced portions disposed on opposite sides of the frame for laterally supporting the patient;

the chest-supporting portion and the knee-supporting portion being rotatably adjustable relative to an axis of the wheels to enable an inclination thereof to be varied, with an adjustment mechanism provided for holding the chest and knee-supporting portions in adjusted positions;

the frame being foldable about a center axis arranged parallel to the support elements.

* * * * *